United States Patent
Sawai

(10) Patent No.: US 8,047,587 B2
(45) Date of Patent: Nov. 1, 2011

(54) VEHICLE BODY VIBRATION DAMPING APPARATUS

(75) Inventor: Seji Sawai, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 130 days.

(21) Appl. No.: 12/344,372

(22) Filed: Dec. 26, 2008

(65) Prior Publication Data

US 2009/0167036 A1    Jul. 2, 2009

(30) Foreign Application Priority Data

Dec. 27, 2007    (JP) .................. 2007-336039

(51) Int. Cl.
    *B60R 19/48*    (2006.01)
(52) U.S. Cl. ...................................................... 293/117
(58) Field of Classification Search .................. 293/117,
    293/131, 120, 102, 134, 132, 133; 280/5.515;
    267/139, 35; 701/37; 296/187.09, 204, 193.09,
    296/203.02
    See application file for complete search history.

(56) References Cited

U.S. PATENT DOCUMENTS

| | | | | |
|---|---|---|---|---|
| 1,497,653 A * | 6/1924 | Coote | ............................ | 293/131 |
| 1,622,442 A * | 3/1927 | Guenther et al. | .............. | 293/137 |
| 1,812,417 A | 6/1931 | Thomas | | |
| 2,417,019 A | 3/1947 | Sherman | | |
| 2,593,586 A * | 4/1952 | Maag | ............................ | 293/137 |
| 3,663,048 A * | 5/1972 | Zimmerle | ...................... | 293/135 |
| 3,823,968 A * | 7/1974 | Barenyi | ......................... | 293/131 |
| 3,863,954 A * | 2/1975 | Abromavage et al. | ........ | 280/486 |
| 4,070,052 A | 1/1978 | Ng | | |
| 4,125,276 A | 11/1978 | Levasseur | | |
| 4,279,428 A | 7/1981 | Onodera | | |
| 4,588,054 A * | 5/1986 | LeBaron | ....................... | 188/280 |
| 4,652,031 A * | 3/1987 | Loren et al. | .................... | 293/120 |
| 4,881,712 A * | 11/1989 | Lun | ........................... | 267/140.13 |
| 4,979,867 A * | 12/1990 | Best | .............................. | 414/537 |
| 5,193,788 A * | 3/1993 | Richter et al. | ................. | 267/227 |
| 5,411,311 A | 5/1995 | Shimmell et al. | | |
| 6,007,123 A | 12/1999 | Schwartz et al. | | |
| 6,044,939 A * | 4/2000 | Forster | ........................ | 188/266.6 |
| 6,168,228 B1 | 1/2001 | Heinz et al. | | |

(Continued)

FOREIGN PATENT DOCUMENTS

EP    0 395 343 A2    10/1990

(Continued)

OTHER PUBLICATIONS

European Search Report citing references submitted in this Information Disclosure Statement.

*Primary Examiner* — Kiran B. Patel

(74) *Attorney, Agent, or Firm* — Keating & Bennett, LLP

(57) ABSTRACT

A bumper reinforcement 11 that extends in a vehicle width direction and is removably attached to a vehicle body frame 4 is provided. A vibration damping portion integrally provided with the bumper reinforcement 11 is provided. The vibration damping portion is formed by a hydraulic damper 3 formed into an elongated shape extending in the vehicle width direction and generates damping force with respect to elastic deformation of the bumper reinforcement 11 in the vehicle width direction. Moreover, both ends of the hydraulic damper 3 in the vehicle width direction are fixed to the bumper reinforcement 11.

8 Claims, 11 Drawing Sheets

U.S. PATENT DOCUMENTS

| | | |
|---|---|---|
| 6,189,952 B1 | 2/2001 | Schmidt et al. |
| 6,206,460 B1 | 3/2001 | Seeliger et al. |
| 6,390,224 B1 | 5/2002 | Yoshida |
| 6,467,836 B1 | 10/2002 | Miller et al. |
| 6,474,708 B1 * | 11/2002 | Gehringhoff et al. ......... 293/120 |
| 6,494,510 B2 * | 12/2002 | Okamura et al. ............. 293/149 |
| 6,540,275 B1 * | 4/2003 | Iwamoto et al. ................ 293/24 |
| 6,595,533 B2 | 7/2003 | Sawai et al. |
| 6,742,808 B1 | 6/2004 | Kosak |
| 6,893,078 B2 * | 5/2005 | Saeki ....................... 296/187.09 |
| 6,988,753 B1 * | 1/2006 | Omura et al. .................... 293/13 |
| 7,229,098 B2 | 6/2007 | Mangalaramanan et al. |
| 7,364,222 B2 * | 4/2008 | Tanabe ..................... 296/187.03 |
| 7,384,094 B2 * | 6/2008 | Siedlecki et al. ........ 296/193.11 |
| 7,540,480 B2 * | 6/2009 | Sawai et al. ................... 267/221 |
| 7,604,247 B2 * | 10/2009 | Kondou ................ 280/124.109 |
| 7,673,904 B2 * | 3/2010 | Harada et al. ................. 280/782 |
| 7,686,358 B2 * | 3/2010 | Takahashi et al. ............ 293/102 |
| 7,735,909 B2 | 6/2010 | Satou et al. |
| 7,845,661 B2 | 12/2010 | Kondou et al. |
| 2002/0153749 A1 | 10/2002 | Lee |
| 2002/0179389 A1 * | 12/2002 | Sawai ...................... 188/322.18 |
| 2003/0160466 A1 | 8/2003 | Bladow et al. |
| 2004/0108754 A1 | 6/2004 | Igarashi et al. |
| 2004/0124643 A1 * | 7/2004 | Matsumoto et al. .......... 293/115 |
| 2005/0248113 A1 | 11/2005 | Kiel et al. |
| 2006/0125225 A1 * | 6/2006 | Kondou et al. ............... 280/781 |
| 2006/0151270 A1 * | 7/2006 | Sakai et al. .................... 188/313 |
| 2009/0001679 A1 * | 1/2009 | Kajino et al. .......... 280/124.106 |
| 2009/0024323 A1 * | 1/2009 | Tanabe .......................... 701/301 |
| 2009/0050395 A1 * | 2/2009 | Hosokawa et al. ........... 180/274 |
| 2009/0079232 A1 | 3/2009 | Harada et al. |
| 2009/0101459 A1 * | 4/2009 | Sawai ....................... 188/266.6 |
| 2010/0038922 A1 * | 2/2010 | Takahashi et al. ............ 293/117 |
| 2010/0072009 A1 * | 3/2010 | Yamazaki et al. ............ 188/269 |
| 2010/0078245 A1 * | 4/2010 | Rolfe et al. ................... 180/165 |

FOREIGN PATENT DOCUMENTS

| | | |
|---|---|---|
| EP | 1 209 062 A2 | 5/2002 |
| EP | 1 225 119 A2 | 7/2002 |
| EP | 1 671 872 A1 | 6/2006 |
| GB | 1 242 273 A1 | 8/1971 |
| JP | 2002-211437 | 7/2002 |
| JP | 2002-211437 A | 7/2002 |
| KR | 102007 0118361 A1 | 12/2007 |
| WO | 2004/104442 A1 | 12/2004 |
| WO | 2005/077738 A1 | 8/2005 |

* cited by examiner

VEHICLE BODY VIBRATION DAMPING APPARATUS

This application claims priority under 35 U.S.C. §119 to Japanese Patent Application No. 2007-336039 filed on Dec. 27, 2007, the entire disclosure of which is incorporated herein by reference in its entirety.

BACKGROUND OF THE INVENTION

1. Field of the Invention

The preferred embodiments of the present invention relate to, inter alia, a vehicle body vibration damping apparatus that dampens the vibration of a vehicle body frame of a vehicle.

2. Description of the Related Art

The following description sets forth the inventors' knowledge of related art and problems therein and should not be construed as an admission of knowledge in the prior art.

In some conventional cases, in a vehicle body frame of an automobile, a reinforcing member as disclosed in U.S. Pat. No. 5,411,311 (hereinafter referred to as "Patent Document 1") is attached, or retrofitted, and used in order to partially improve the rigidity in accordance with a running condition and/or a preference of a driver. The reinforcing member disclosed in Patent Document 1 is formed into an elongated shape and positioned in an engine compartment.

This reinforcing member is attached to upper end portions, i.e., a pair of right and left suspension towers, of a vehicle body frame so as to connect the suspension towers to each other. This reinforcing member reinforces the vehicle body with respect to forces applied to the vehicle body in the vehicle width direction from an upper end portion of a shock absorber for a front wheel suspension device.

The above-described reinforcing member is elastically deformed by compression when a load is applied in the vehicle width direction, and due to the immediate release of the load, the reinforcing member generates vibration, which may deteriorate the riding comfort. In order to prevent the generation of the vibration, a hydraulic damper or a vibration damping portion such as rubber may be provided on a halfway portion in the longitudinal direction as disclosed in Japanese Unexamined Laid-open Patent Publication No. 2002-211437 (hereinafter referred to as "Patent Document 2").

The device disclosed in Patent Document 2 constitutes a vehicle body vibration damper capable of damping the vibration of a vehicle body rather than reinforcing the vehicle body.

In the above-described vehicle body vibration damper disclosed in Patent Document 2, it is preferable to attach the damper to a vehicle body frame during the assembling procedures of the vehicle body. However, this increases the number of steps of assembling the vehicle body by the steps of attaching the vehicle body vibration damper to the vehicle body frame, which results in increased production cost.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some preferred embodiments of the present invention can provide a vehicle body vibration damping apparatus that can be attached to a vehicle body frame without increasing the number of assembling steps of a vehicle body.

According to a first aspect of a preferred embodiment of the present invention, a vehicle body vibration damping apparatus includes: a bumper reinforcement to be removably attached to an end of a vehicle body frame in a forward and rearward direction of the vehicle body frame in a state in which the bumper reinforcement extends in a vehicle width direction; and a vibration damping portion integrally attached to the bumper reinforcement. The vibration damping portion includes a hydraulic damper which is formed into an elongated shape extending in the vehicle width direction and configured to generate damping force with respect to elastic deformation of the bumper reinforcement in the vehicle width direction. Furthermore, both ends of the hydraulic damper in the vehicle width direction are fixed to the bumper reinforcement.

According to a second aspect of a preferred embodiment of the present invention, a vehicle body vibration damping apparatus includes: a bumper reinforcement to be removably attached to an end of a vehicle body frame in a forward and rearward direction of the vehicle body frame in a state in which the bumper reinforcement extends in a vehicle width direction; and a vibration damping portion integrally attached to the bumper reinforcement. The bumper reinforcement is a tubular shaped metallic member. Furthermore, the vibration damping portion is formed by filling a viscoelastic material into a hollow portion of the bumper reinforcement.

According to a third aspect of a preferred embodiment of the present invention, a vehicle body vibration damping apparatus includes: a bumper reinforcement to be removably attached on an end of a vehicle body frame in a forward and rearward direction of the vehicle body frame in a state in which the bumper reinforcement extends in a vehicle width direction; and a vibration damping portion integrally attached to the bumper reinforcement. The bumper reinforcement is a tubular shaped metallic member. Furthermore, the vibration damping portion is formed by filling a particulate material into a hollow portion of the bumper reinforcement.

According to the aforementioned preferred embodiment of the present invention, as the vibration damping portion formed by the hydraulic damper is attached to the bumper reinforcement, the vibration damping portion can be installed to the vehicle body frame by attaching the bumper reinforcement to the vehicle body frame. Consequently, it is unnecessary to provide the step of installing the vibration damping portion in the vehicle body frame in an assembly line of the vehicle body. Thus, it is possible to provide a vehicle body vibration damping apparatus that can be attached to the vehicle body frame without increasing the number of steps of assembling the vehicle body.

According to the aforementioned preferred embodiment of the present invention including the vibration damping portion using the viscoelastic materials, attachment of the bumper reinforcement to the vehicle body frame allows the vibration damping portion to be installed in the vehicle body frame. Consequently, it is unnecessary to provide the step of solely installing the vibration damping portion to the vehicle body frame in an assembly line of the vehicle body. Thus, it is possible to provide a vehicle body vibration damping apparatus that can be installed in the vehicle body frame without increasing the number of steps of assembling the vehicle body.

According to the aforementioned preferred embodiment of the present invention including the vibration damping portion using the particulate materials, the vibration damping portion can be attached to the vehicle body frame with the bumper reinforcement. Consequently, it is unnecessary to provide the step of solely installing the vibration damping portion in the vehicle body frame in an assembly line of the vehicle body. Thus, it is possible to provide a vehicle body vibration damping apparatus that can be installed in the vehicle body frame without increasing the number of steps of assembling the vehicle body.

The above and/or other inventions, aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention are described by way of example and not limitation. It should be understood based on this disclosure that various other modifications can be made by those in the art based on these illustrated embodiments.

First Embodiment

Hereinafter, a first embodiment of a vehicle body vibration damping apparatus according to the present invention will be explained with reference to FIGS. 1 to 4 in detail.

Figure 1:
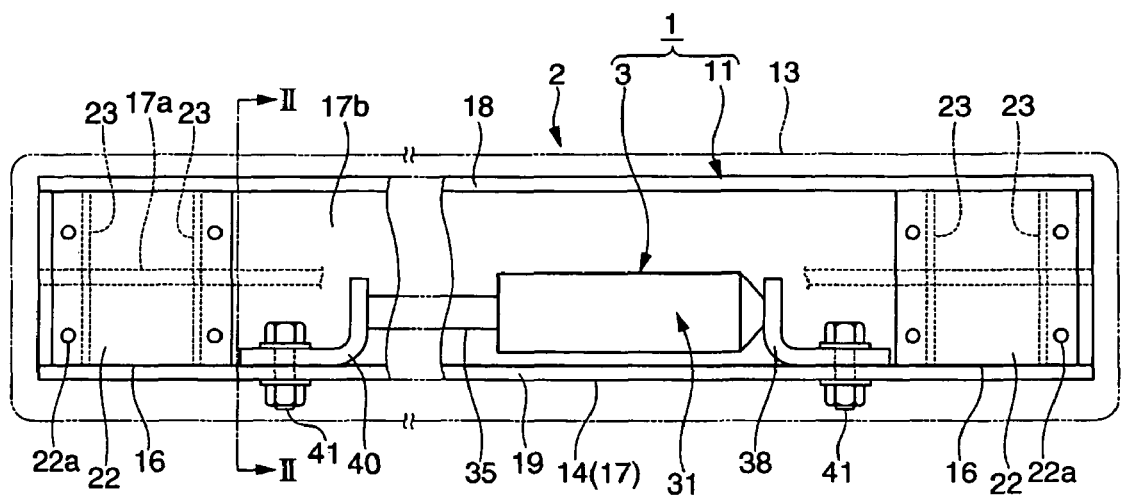
FIG. 1 is a front view showing a configuration of a vehicle body vibration damping apparatus according to an embodiment of the present invention.
Figure 2:
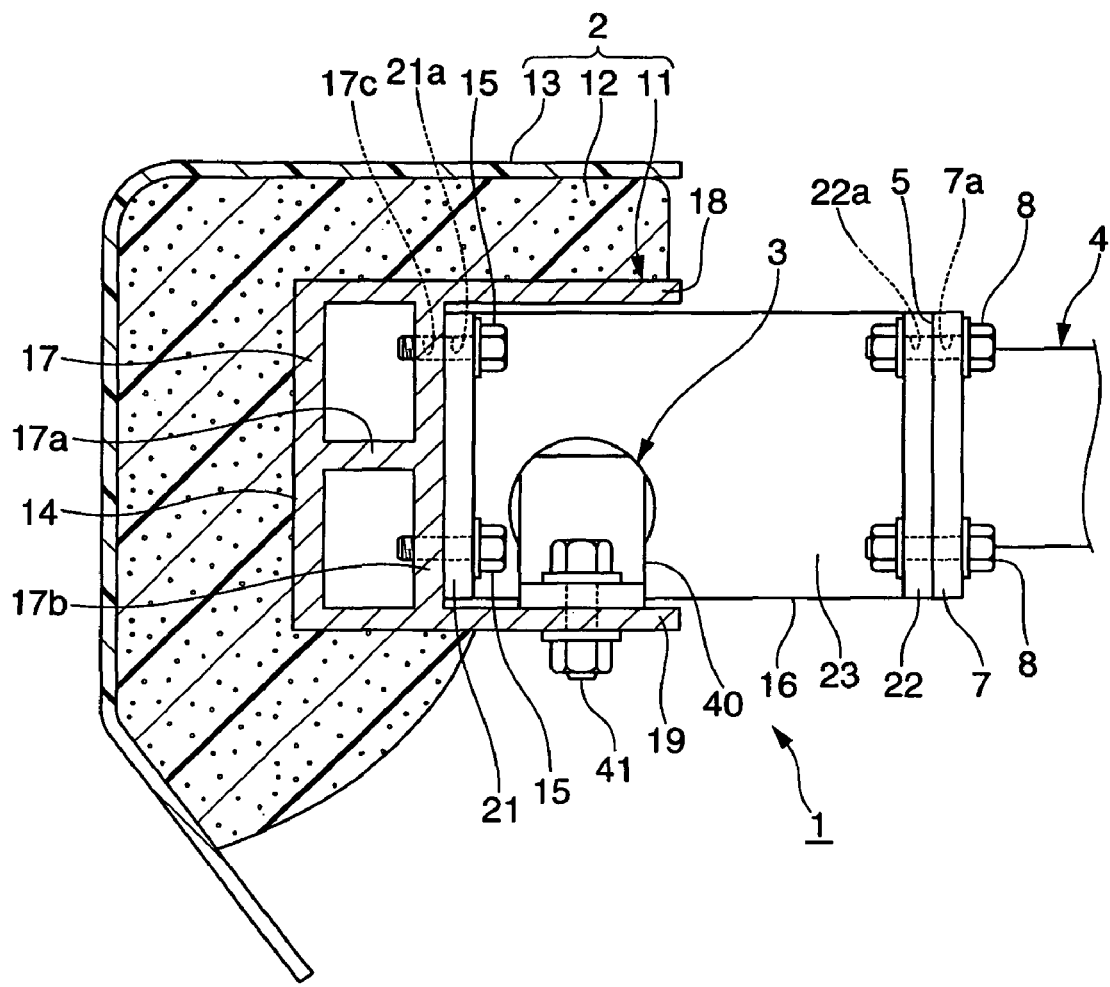
FIG. 2 is a cross-sectional view showing a state in which a bumper is attached to the vehicle body frame.
Figure 3:
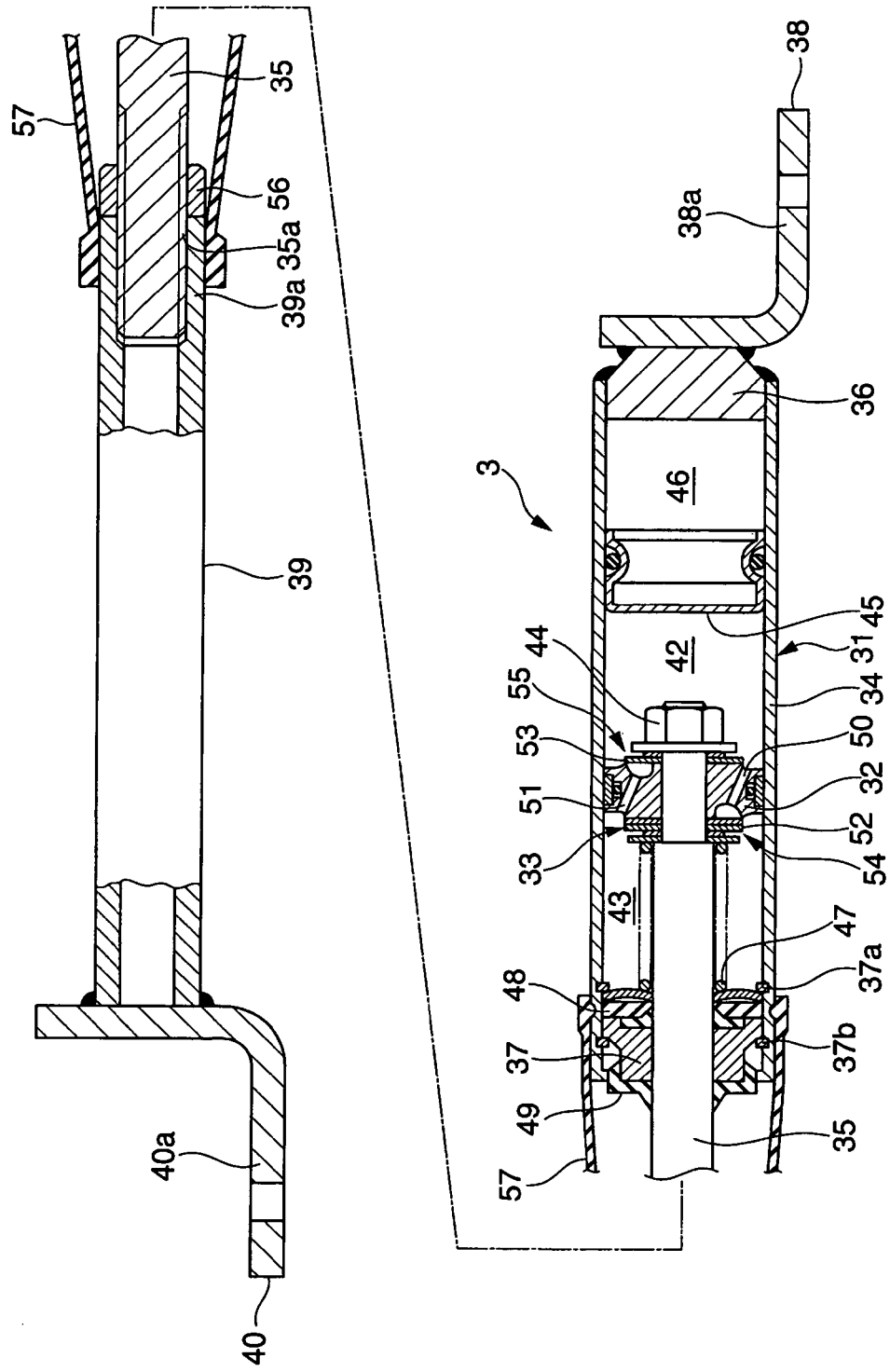
FIG. 3 is a cross-sectional view of a hydraulic damper.
Figure 4:
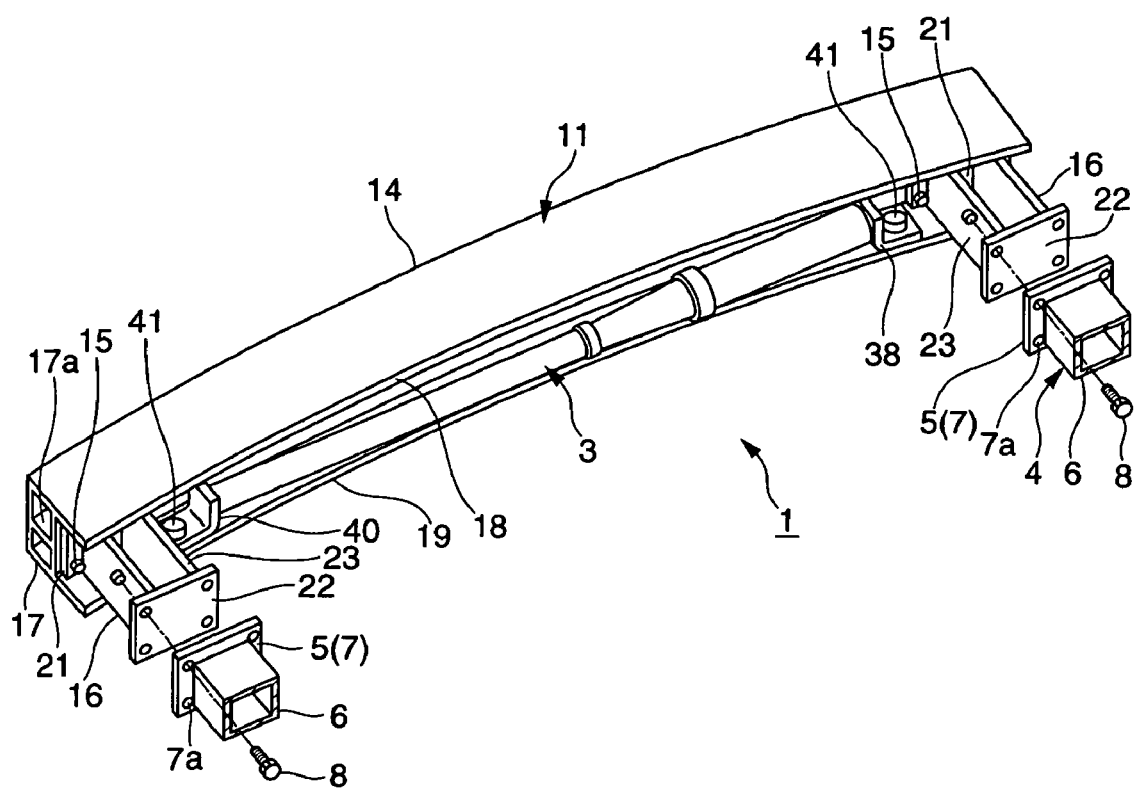
FIG. 4 is a perspective view of a bumper reinforcement to which the hydraulic damper is attached and a bumper mounting portion of the vehicle body frame.
Figure 5:
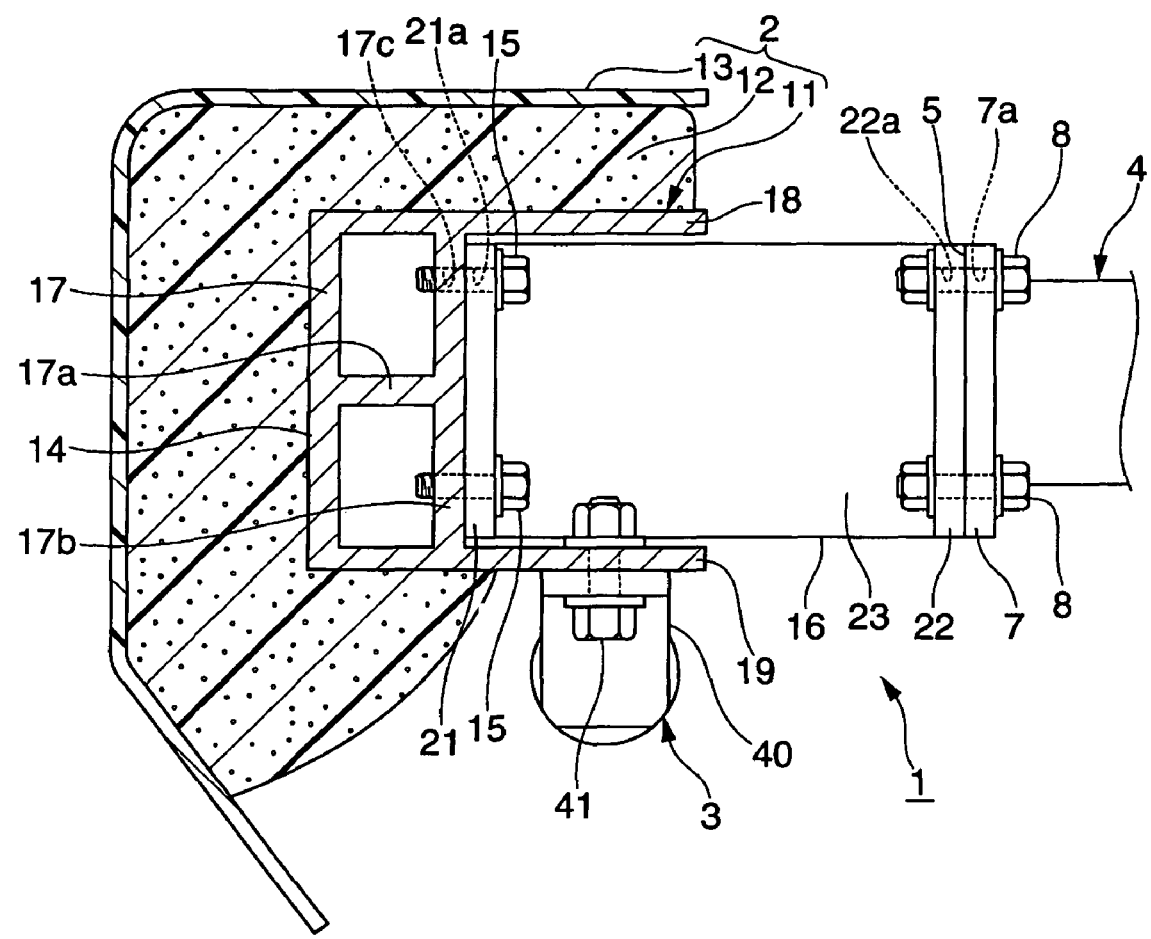
FIG. 5 is a cross-sectional view showing another embodiment in which a hydraulic damper is attached below a lower plate of the bumper reinforcement.

FIG. 1 is a front view showing a configuration of a vehicle body vibration damping apparatus according to the present invention. In FIG. 1, a bumper is depicted in a state that it is viewed from the side of a vehicle body frame. FIG. 2 is an enlarged cross-sectional view taken along the line II-II in FIG. 1 and showing the state in which the bumper is attached to a vehicle body frame. FIG. 3 is a cross-sectional view of a hydraulic damper, and FIG. 4 is a perspective view showing a bumper reinforcement to which the hydraulic damper is attached and a bumper mounting portion of the vehicle body frame. In FIG. 4, the bumper mounting portion is illustrated in a state that it is separated from the vehicle body frame. FIG. 5 is an enlarged cross-sectional view showing another embodiment in which the hydraulic damper is attached below a lower plate of the bumper reinforcement.

In these figures, the reference numeral "1" denotes a vehicle body vibration damping apparatus according to this embodiment. As shown in FIGS. 1 and 2, this vehicle body vibration damping apparatus 1 includes a hydraulic damper 3 serving as a vibration damping portion and a bumper reinforcement 11 partially constituting a vehicle bumper 2. As shown in FIGS. 2 and 4, the vehicle body vibration damping apparatus 1 is removably attached to a bumper mounting portions 5 of a vehicle body frame 4.

The vehicle body frame 4 is of a so-called ladder type. As shown in FIG. 4, the vehicle body frame 4 includes a pair of right and left side frames 6 and 6 and a plurality of cross members (not shown) connecting these side frames 6 and 6. Vehicle components, such as, e.g., a wheel suspension device and an engine, are mounted on the vehicle body frame 4 (not shown). The bumper mounting portions 5 are provided at the distal end portions of the side frames 6 and 6 (vehicle body front side end portions or vehicle body rear side portions).

The bumper mounting portion 5 is formed by a rectangular plate member 7 provided at the tip end portion of the side frame 6 to extend in the vertical direction as well as in the vehicle width direction. The plate member 7 has, at portions corresponding to its four corner, bolt holes 7a for inserting a bolt portion of a bumper reinforcement fixing bolt 8.

As shown in FIG. 2, the bumper 2 includes the bumper reinforcement 11 attached to the bumper mounting portion 5 with the fixing bolts 8, a buffer member 12 for covering the bumper reinforcement 11, and a cover 13 for covering the buffer member 12. As shown in FIGS. 2 and 4, the bumper reinforcement 11 includes a bumper reinforcement body 14 extending in the vehicle width direction, and a pair of right and left mounting members 16 and 16 attached to both widthwise ends of the bumper reinforcement body 14 with fixing bolts 15.

As shown in FIG. 4, the bumper reinforcement body 14 of this embodiment is outwardly curved with respect to the vehicle body frame 4 (i.e., curved in the forward direction of the vehicle body in the case of the bumper reinforcement body 14 for a front bumper; and curved in the rearward direction of the vehicle body in the case of the bumper reinforcement body 14 for a rear bumper).

As shown in FIG. 2, the bumper reinforcement body 14 includes a rectangular tube 17 extending longitudinally in the vehicle width direction, an upper plate 18 extended from an upper end portion of the rectangular tube 17, and a lower plate 19 extended from a lower end portion of the rectangular tube 17. The rectangular tube 17, the upper plate 18, and the lower plate 19 are integrally formed by a drawing process using an aluminum alloy material.

As shown in FIG. 2, a partition wall 17a for vertically dividing the inside of the rectangular tube 17 into two parts is provided in the rectangular tube 17. This partition wall 17a extends from one end of the rectangular tube 17 to the other end thereof. Each of the upper plate 18 and the lower plate 19 is formed by a flat plate extending from one end toward the other end of the rectangular tube 17. The upper plate 18 horizontally protrudes from the upper end portion of the rectangular tube 17 toward the side of the vehicle body frame 4, and the lower plate 19 horizontally protrudes from the lower end portion of the rectangular tube 17 toward the side of the vehicle body frame 4.

The mounting member 16 is formed into the given shape by combining and welding a plurality of plate members made of aluminum alloy. As shown in FIGS. 2 and 4, the mounting member 16 of this embodiment includes a first plate member 21 fixed by the fixing bolts 15 to a vertical wall 17b of the rectangular tube 17 opposed to the bumper mounting portion 5, a second plate member 22 fixed to the bumper mounting portion 5 by the fixing bolts 8, and two third plate members 23 connecting the first plate member 21 and the second plate member 22.

The first and second plate members 21 and 22 are disposed so as to extend in the vertical direction as well as in the vehicle width direction. The first plate member 21 is formed to have a size that can be disposed between the upper plate 18 and the lower plate 19. The two third plate members 23 are disposed so as to extend in the vertical direction as well as in the forward and rearward direction and are welded in a parallel state to the first and second plate members 21 and 22. The third plate members 23 are also formed to have a size that can be disposed between the upper plate 18 and the lower plate 19.

As shown in FIG. 2, the fixing bolt 15 for fixing the first plate member 21 to the rectangular tube 17 is inserted into a bolt hole 21a formed in the first plate member 21 and threaded into a female screw hole 17c formed in the vertical wall 17b of the rectangular tube 17.

As shown in FIG. 2, the second plate member 22 has bolt holes 22a for inserting a bolt portion of the fixing bolt 8 at portions corresponding to the bolt holes 7a of the bumper mounting portion 5.

The buffer member 12 is made of, e.g., a foamed plastic article of a given shape covering the bumper reinforcement 11 from the front, upper and lower sides thereof, and is fixed to the bumper reinforcement 11 by, e.g., bolt fastening, hook fastening, adhesion.

The cover 13 is a plastic member constituting an outer appearance of the bumper 2 and covers an outer portion of the buffer member 12. In this embodiment, the cover 13 is fixed to the bumper reinforcement 11 by bolts (not shown). Additionally, in a vehicle design in which an outer surface of the cover 13 is flush with a surface (an outer appearance surface) of an outer appearance member of the vehicle (for example, a body), the cover 13 can be fixed to the outer appearance member by bolts.

As shown in FIGS. 1 and 4, the hydraulic damper 3 is formed of an elongated shape extending from the vehicle widthwise one end of the bumper reinforcement 11 to the other end thereof, and is configured to generate a damping force against the vehicle widthwise elastic deformation of the bumper reinforcement 11. As shown in FIG. 3, the hydraulic damper 3 of this embodiment includes a hydraulic cylinder 31 and damping force generating means 33 provided on a piston 32 of the hydraulic cylinder 31.

The hydraulic cylinder 31 includes a cylinder tube 34, the piston 32, a piston rod 35, a plug member 36 for blocking an end of the cylinder tube 34 opposite to the piston rod 35, a rod guide 37 for blocking an end of the cylinder tube 34 at the side of the piston rod 35, a first mounting bracket 38 welded to the plug member 36, and a second mounting bracket 40 connected to a distal end of the piston rod 35 via an extension rod 39.

The hydraulic damper 3 is attached to the lower plate 19 of the bumper reinforcement 11 by the first and second mounting brackets 38 and 40. The first and second mounting brackets 38 and 40 are each formed into an L-shape in cross-section having a horizontal mounting portion 38a and 40a, and the first and second mounting brackets 38 and 40 are attached to the lower plate 19 by a mounting bolt 41 (see FIGS. 2 and 4) in a state in which the mounting portions 38a and 40a are laid on an upper surface of the lower plate 19. As shown in FIGS. 1 and 4, the first and second mounting brackets 38 and 40 are attached to the inner sides of the lower plate 19 in the vehicle width direction than the mounting portion 16.

In the bumper reinforcement 11, a dead space enclosed from three directions by the bumper reinforcement body 14 and the pair of right and left mounting members 16 and 16 is formed. In this embodiment, as the hydraulic damper 3 is housed in the dead space, possible interference between the hydraulic damper 3 and other components can be prevented at the time of mounting the vehicle body vibration damping apparatus 1 to the vehicle body frame 4.

By attaching the hydraulic damper 3 to the bumper reinforcement 11 in this manner, both vehicle widthwise ends of the hydraulic damper 3 are fixed to both ends of the bumper reinforcement 11, while the hydraulic damper 3 is housed in the bumper reinforcement 11.

The piston 32 is formed to have a circular cross-section to be fitted in the cylinder tube 34. Moreover, the piston 32 defines a first oil chamber 42 and a second oil chamber 43 in the cylinder tube 34 and is fixed to the piston rod 35 penetrating through the axis by a fixing nut 44.

The first oil chamber 42 is formed between the piston 32 and a free piston 45 movably fitted in the cylinder tube 34. The free piston 45 defines the first oil chamber 42 and a high pressure gas chamber 46 in one end portion of the cylinder tube 34. The high pressure gas chamber 46 is constituted by the cylinder tube 34, the plug member 36, and the free piston 45. The high pressure gas chamber 46 is filled by high pressure $N_2$ gas.

The piston 32 is urged in the direction that the hydraulic cylinder 31 is compressed by a compression coil spring 47 elastically fitted between the piston 32 and the rod guide 37. The rod guide 37 is fitted in the cylinder tube 34 and fixed thereto by circlips 37a and 37b.

Seal members 48 and 49 for sealing a portion through which the piston rod 35 penetrates are provided on both axial ends of the rod guide 37.

The compression coil spring 47 serves to balance out gas reaction force applied to the piston 32 through hydraulic oil in the cylinder tube 34. This reaction force is generated since a pressure receiving area on the side of the second oil chamber 43 is smaller than that on the side of the first oil chamber 42 in the piston 32.

In other words, as the hydraulic oil in the first and second oil chambers 42 and 43 is pressurized by the high pressure $N_2$ gas, the piston 32 receives gas reaction force corresponding to the difference of the pressure receiving areas from the hydraulic oil, and is urged in the extending direction of the hydraulic cylinder 31 by this gas reaction force. In the hydraulic damper 3 of this embodiment, the free length of the hydraulic damper 3 is defined in a state in which the gas reaction force is balanced out by elastic force of the pressure coil spring 47. In this hydraulic damper 3, the pressure of $N_2$ gas is adjusted so that the free length corresponds to the mounting dimension to the bumper reinforcement 11.

By adjusting the free length to conform to the mounting dimension to the bumper reinforcement 11 in this manner, the attachment of the hydraulic damper 3 to the bumper reinforcement 11 becomes easy. Moreover, without operating the pressure by the gas reaction force to the bumper reinforcement 11, almost only damping force can act on the bumper reinforcement 11.

The damping force generating means 33 provided on the piston 32 has substantially the same configuration as that used in a suspension shock absorber and the like, and includes first and second check valves 54 and 55 provided with plate springs 52 and 53 for opening and closing an opening of one end of communication holes 50 and 51 formed in the piston 32. The plate springs 52 and 53 are formed to be annular and fixed to the piston 32 on their inner peripheral portions in a state in which plural plate springs are stacked.

The first check valve 54 generates a damping force by allowing the hydraulic oil to flow against the elastic force of the plate spring 52 in one direction from the first oil chamber 42 to the second oil chamber 43. The second check valve 55 generates a damping force by allowing the hydraulic oil to flow against the elastic force of the plate spring 53 in one direction from the second oil chamber 43 to the first oil chamber 42.

The extension rod 39 interposed between the distal end of the piston rod 35 and the second mounting bracket 40 is formed by a pipe. One end of the extension rod 39 is screwed in the distal end of the piston rod 35. The other end of the extension rod 39 is welded to the second mounting bracket 40.

The connecting portion between the one end of the extension rod 39 and the piston rod 35 has a configuration in which a male screw 35a formed on the piston rod 35 is screwed to a female screw 39a of the extension rod 39 and a lock nut 56 tightens the connected portion. Adopting this mounting structure of the extension rod 39 by screws allows fine adjustments of the free length of the hydraulic damper 3 which changes due to fluctuations of the $N_2$ gas pressure. A rubber cover 57 covers an outer side of a portion between the one end of the extension rod 39 to which the piston rod 35 is screwed and an end of the cylinder tube 34 at the side of the piston rod 35.

The vehicle body vibration damping apparatus 1 configured as explained above is assembled by attaching the hydraulic damper 3 to the bumper reinforcement 11 by the mounting bolts 41. This assembly of the vehicle body vibration damping apparatus 1 is performed at a different place other than the assembly line of the vehicle body where various components are mounted to the vehicle body frame 4. Meanwhile, the attachment of the vehicle body vibration damping apparatus 1 to the vehicle body frame 4 is performed in the assembly line of the vehicle body.

To attach the vehicle body vibration damping apparatus 1 to the vehicle body frame 4, the second plate member 22 of the mounting member 16 is stacked on the plate member 7 of the bumper mounting portion 5, and both plate members 7 and 22 are fixed by the fixing bolts 8. After the bumper reinforcement 11 is attached to the vehicle body frame 4 in this manner, the buffer member 12 and the cover 13 are assembled to the bumper reinforcement 11. By assembling the buffer member 12 and the cover 13 to the bumper reinforcement 11, the bumper 2 is completed.

In a vehicle having the vehicle body vibration damping apparatus 1 as configured above, vehicle widthwise forces are applied to the vehicle body frame 4 in accordance with the running conditions, such as, e.g., turning. At this time, the vehicle body frame 4 is elastically deformed in the vehicle width direction even though it is a slight deformation of several micrometers to several millimeters. This causes elastic deformation of the bumper reinforcement body 14 in the vehicle width direction similarly to the vehicle body frame 4 since it is connected to the vehicle body frame 4 through the mounting members 16. In accordance with the elastic deformations of the bumper reinforcement body 14 in the vehicle width direction, the hydraulic damper 3 will be extended or contracted.

Then, the action is buffered due to the damping effect of the hydraulic damper 3, so that the possible vibration generated to the bumper reinforcement body 14 and the vehicle body frame 4 after the elastic deformations can be dampened.

The vehicle body vibration damping apparatus 1 according to this embodiment is constituted by preliminarily attaching the hydraulic damper 3 to the bumper reinforcement 11, so that the apparatus can be installed in the vehicle body frame 4 by attaching the bumper reinforcement 11 to the vehicle body frame 4.

That is, in this embodiment, it is unnecessary to provide the step of solely attaching the vibration damper 3 to the vehicle body frame 4 in an assembly line of the vehicle body. Thus, the vehicle body vibration damping apparatus 1 according to this embodiment can be installed in the vehicle body frame 4 without increasing the number of steps in the assembly of the vehicle body. Moreover, in any vehicles, the bumper reinforcement 11 is originally a long member which is fixed to the vehicle body frame 4 in the vehicle width direction and has a structure capable of easily securing a dead space along its longitudinal direction. Accordingly, by disposing the hydraulic damper in the dead space, the possible interference between the hydraulic damper 3 and other components can be prevented in the assembly of the vehicle body vibration damping apparatus 1 to the vehicle body frame 4. Consequently, there is no restriction regarding attaching positions and attaching methods, etc., of the hydraulic damper and other components as in a conventional apparatus.

The bumper reinforcement body 14 in this embodiment is curved so as to be convexed with respect to the vehicle body frame 4. Accordingly, when the vehicle body frame 4 is elastically deformed in the vehicle width direction as described above, the elastic deformations of the bumper reinforcement body 14 easily occur so that the curvature of the curve is increased or decreased. In other words, the bumper reinforcement body 14 is capable of bending.

Accordingly, when the vehicle frame 4 is elastically deformed in the vehicle width direction, the bumper reinforcement body 14 will not prevent the deformation of the vehicle body frame 4 with an excessively large force, so that the bumper reinforcement body 14 can be elastically deformed in a similar manner. As a result, the displacements of the vehicle body frame 4 are efficiently transmitted to the vehicle body vibration damping apparatus 1, which improves the responsiveness when the vehicle body frame 4 is vibrated in the vehicle width direction and the vehicle body vibration damping apparatus 1 generates the damping force.

In this embodiment, an example in which the first plate member 21 of the mounting member 16 is attached to the bumper reinforcement body 14 by the fixing bolts 15 is shown. However, the first plate member 21 can be welded to the bumper reinforcement body 14.

In this embodiment, an example in which the hydraulic damper 3 is attached to an upper surface of the lower plate 19 so as to be positioned above the lower plate 19 is shown. However, the mounting position of the hydraulic damper 3 can be changed as shown in FIGS. 5 through 7.

FIG. 5 is a cross-sectional view showing another embodiment in which the hydraulic damper is attached below the lower plate of the bumper reinforcement. FIG. 6 is a front view showing still another embodiment in which the hydraulic damper is attached below the rectangular tube of the bumper reinforcement body, and in this figure the bumper is illustrated in a state that it is viewed from the side of the vehicle body frame. FIG. 7 is a cross-sectional view taken along the line VII-VII of FIG. 6. In these figures, the identical and corresponding parts as those explained in FIGS. 1 through 4 are denoted by the same reference numerals and the detailed explanation thereof is appropriately omitted.

The hydraulic damper 3 shown in FIG. 5 is attached to a lower surface of the lower plate 19 so as to be positioned below the lower plate 19 of the bumper reinforcement 11 shown in the first embodiment. The hydraulic damper 3 can be attached below or above the upper plate 18 instead of above or below the lower plate 19. Even in cases where the hydraulic damper 3 is attached below the lower plate 19 as shown in FIG. 5 or attached above or below the upper plate 18, the buffer member 12 is formed to cover the bumper reinforcement body 14 from the front, upper and lower sides thereof.

Figure 6:
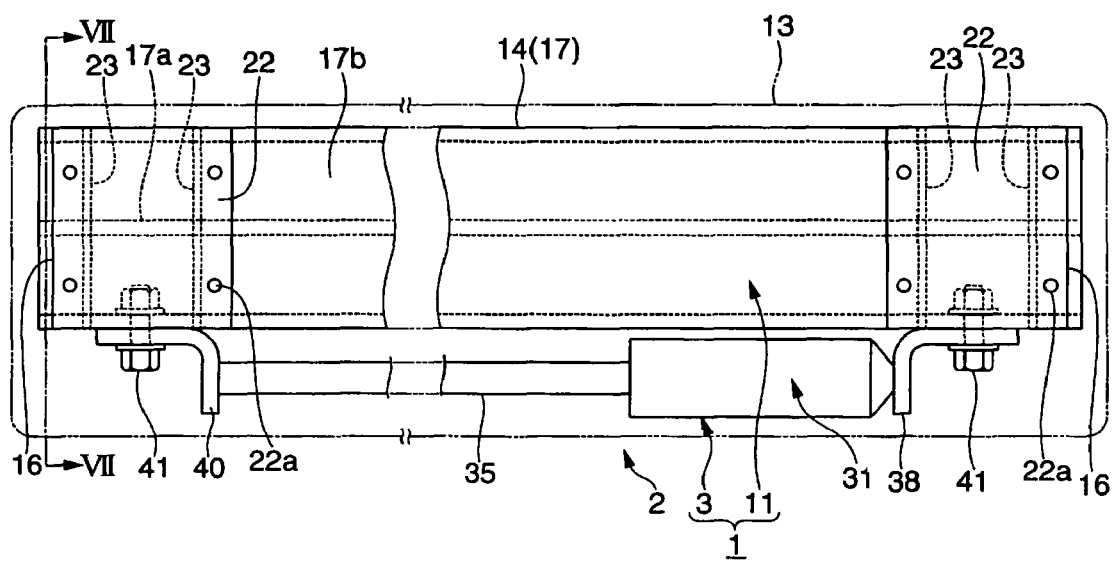
FIG. 6 is a front view showing still another embodiment in which a hydraulic damper is attached below a bumper reinforcement body.
Figure 7:
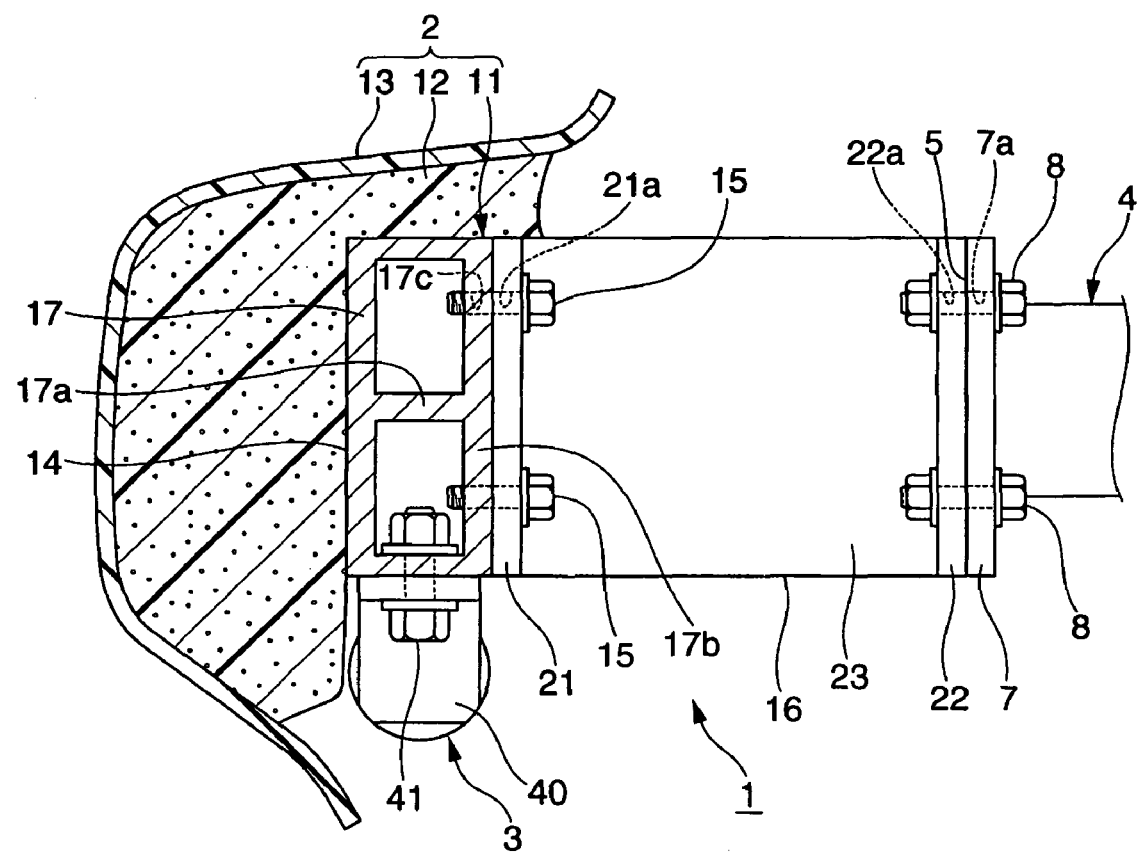
FIG. 7 is a cross-sectional view taken along the line VII-VII of FIG. 6.

The bumper reinforcement body 14 shown in FIGS. 6 and 7 does not include the upper plate 18 and the lower plate 19 shown in the first embodiment, and is constituted by the rectangular tube 17 only. The hydraulic damper 3 shown in these figures is attached below the rectangular tube 17 so as to be positioned below the rectangular tube 17.

When the hydraulic damper 3 is attached to the rectangular tube 17 in the aforementioned manner, the hydraulic damper 3 can be attached above the rectangular tube 17 instead of below the rectangular tube 17. When the hydraulic damper 3 is attached above or below the rectangular tube 17, the buffer member 12 is formed to cover the rectangular tube 17 from the front, and either of the upper side or the lower side on which the hydraulic damper is not positioned.

Even when the hydraulic damper 3 is attached below the lower plate 19, above the upper plate 18, below the upper plate 18, and either of below or above the rectangular tube 17, the same effect as in the embodiments shown in FIGS. 1 through 4 is achieved.

Second Embodiment

Figure 8:
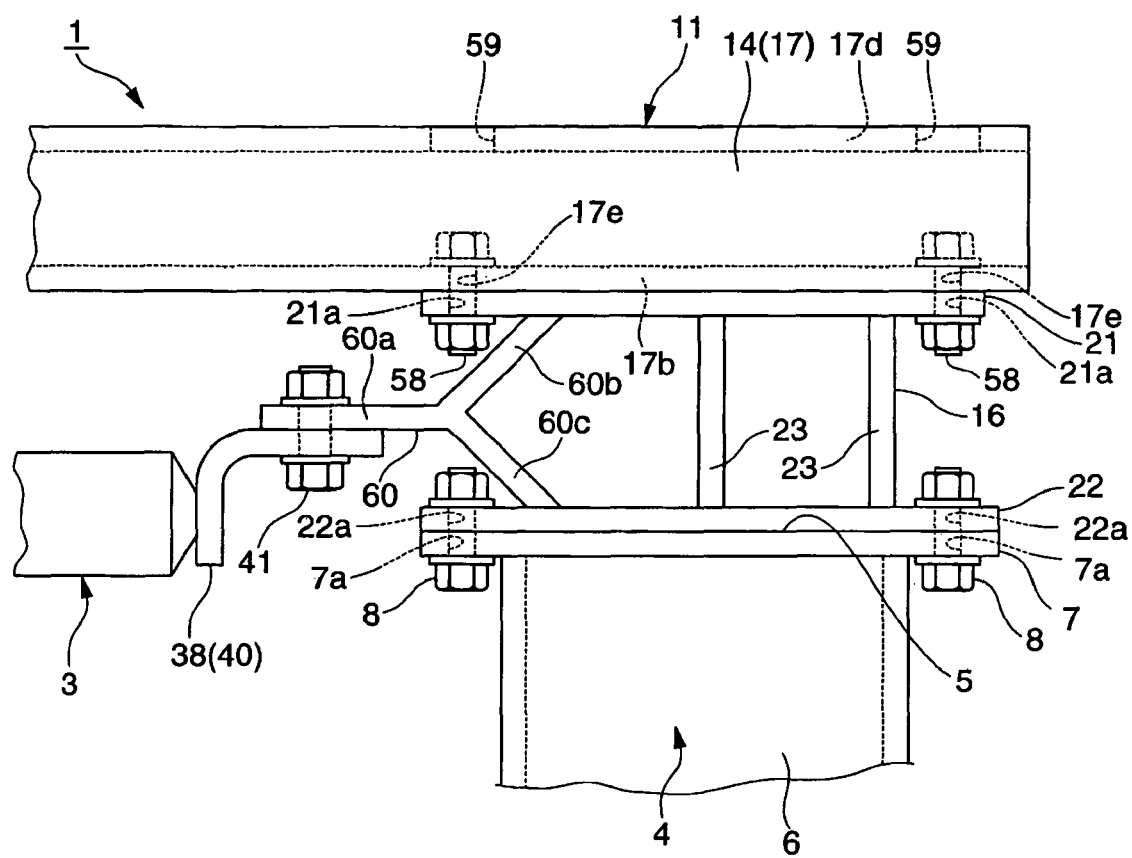
FIG. 8 is a cross-sectional view showing still yet another embodiment in which a hydraulic damper is attached to a mounting member.

According to a second embodiment, the hydraulic damper 3 can be attached to the mounting member 16 as shown in FIG. 8. In this regard, FIG. 8 is a cross-sectional view showing an embodiment in which the hydraulic damper is attached to the mounting member, and in this figure a connecting portion between the mounting member 16 positioned on one end in the vehicle width direction and the hydraulic damper 3 is shown. In the figure, the identical and corresponding parts as those explained in FIGS. 1 through 4 are denoted by the same reference numerals and the detailed explanation thereof is appropriately omitted.

The bumper reinforcement body 14 shown in FIG. 8 does not include the upper plate 18 and the lower plate 19 shown in the first embodiment, and is constituted by the rectangular tube 17 only. The mounting member 16 in this embodiment includes a first plate member 21, a second plate member 22, two third plate members 23, a fourth plate member 60 formed into a Y-shape in a plain view and positioned at the vehicle widthwise inner side than the third plate member 23. These members 21 through 23 and 60 are welded to each other. The first plate member 21 in this embodiment is attached to the vertical wall 17b of the rectangular tube 17 by mounting bolts 58. The mounting bolt 58 is inserted into the rectangular tube 17 through a hole 59 formed in the other vertical wall 17d of the rectangular tube 17, and penetrates through a bolt hole 17e formed in the vertical wall 17b and the bolt hole 21a of the first plate member 21.

The fourth plate member 60 includes a vehicle width direction extending portion 60a extending parallel to the vehicle width direction, and inclined potions 60b and 60c obliquely extending from an outer end of the width direction extending portion 60a in the vehicle width direction toward the first plate member 21 and the second plate member 22. The inclined portion 60b is welded to the first plate member 21, and the inclined portion 60c is welded to the second plate member 22. The first (second) mounting bracket 38(40) of the hydraulic damper 3 is attached to the width direction extending portion 60a by the mounting bolt 41.

In this embodiment, the hydraulic damper 3 is provided in a dead space between the mounting members 16 paired in the vehicle width direction. By connecting the hydraulic damper 3 to the mounting member 16 as mentioned above, the vibration of the vehicle body frame 4 in the vehicle width direction is directly transmitted to the hydraulic damper 3 from the mounting member 16 not through the bumper reinforcement body 14 (the rectangular tube 17). Accordingly, in this embodiment, the vibration of the vehicle body frame 4 can be efficiently dampened with high responsiveness by the hydraulic damper 3.

Third Embodiment

Figure 9:
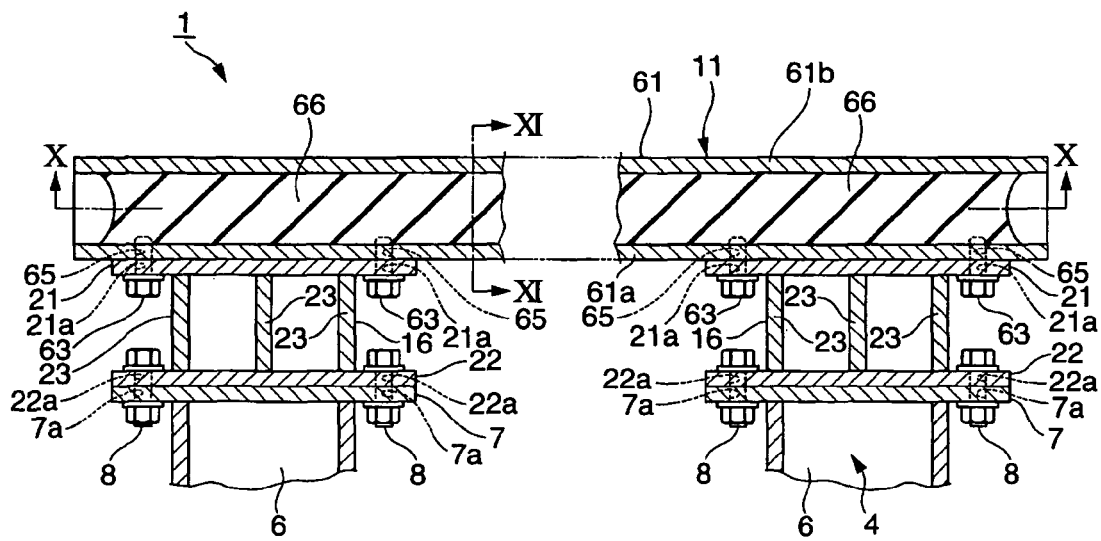
FIG. 9 is a horizontal cross-sectional view showing still yet another embodiment of the vehicle body vibration damping apparatus.
Figure 10:
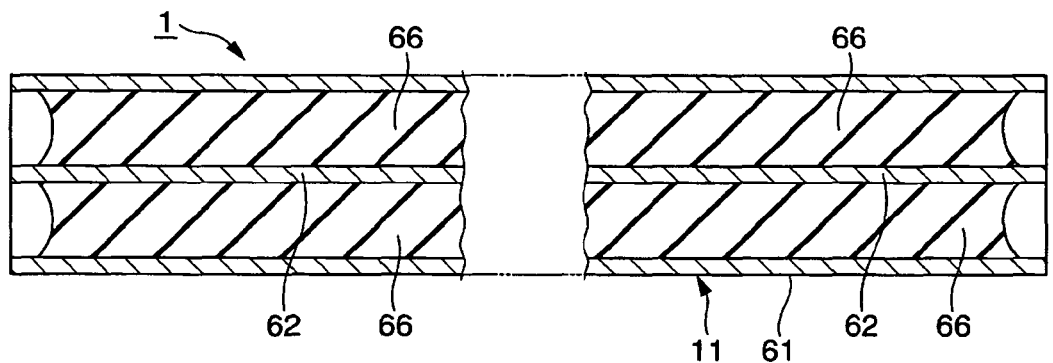
FIG. 10 is a cross-sectional view taken along the line X-X of FIG. 9.
Figure 11:
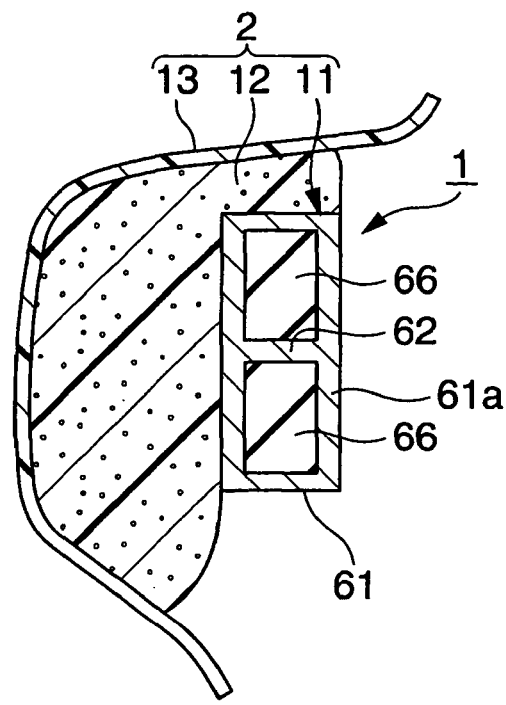
FIG. 11 is a cross-sectional view taken along the line XI-XI of FIG. 9.

According to a third embodiment, the vibration damping portion to be provided on the bumper reinforcement 11 can be constituted by a viscoelastic material as shown in FIGS. 9 through 11. In this regard, FIG. 9 is a horizontal cross-sectional view showing another embodiment of the vehicle body vibration damping apparatus. FIG. 10 is a cross-sectional view taken along the line X-X of FIG. 9, and FIG. 11 is a cross-sectional view taken along the line XI-XI of FIG. 9. FIG. 11 is shown in a state that the buffer member and the cover are attached to the bumper reinforcement body. In these figures, the identical and corresponding parts as those explained in FIGS. 1 through 4 are denoted by the same reference numerals and the detailed explanation thereof is appropriately omitted.

The bumper reinforcement 11 shown in FIGS. 9 through 11 includes a bumper reinforcement body 61 formed into the shape of a rectangular tube and the mounting member 16 for attaching the bumper reinforcement body 61 to the vehicle body frame 4. The bumper reinforcement body 61 is formed into a given shape by a drawing process similarly to the rectangular tube 17 shown in the first embodiment, and a partition wall 62 is provided therein. The partition wall 62 vertically divides the inner space of the bumper reinforcement body 61 into two parts. In the bumper reinforcement body 61 of this embodiment, no upper plate 18 and lower plate 19 as shown in the first embodiment is provided.

The first plate member 21 of the mounting member 16 in this embodiment is attached to a vertical wall 61a of the bumper reinforcement body 61 adjacent to the vehicle body frame 4 by mounting bolts 63. The mounting bolt 63 is inserted through the bolt hole 21a formed in the first plate member 21, and screwed to a bolt hole 65 formed in the vertical wall 61a.

Viscoelastic rubber 66 which is one of viscoelastic materials is filled as a vibration damping portion in a hollow portion of the bumper reinforcement body 61. There are resin-based or rubber-based materials as the viscoelastic materials, and foamed rubber (not shown) can be used as the rubber-based material other than the viscoelastic rubber 66. The viscoelastic rubber 66 in this embodiment is filled into the bumper reinforcement body 61 in a state of having the fluidity, and is solidified in the bumper reinforcement body 61. Accordingly, the viscoelastic rubber 66 adheres to an inner surface of the bumper reinforcement body 61.

In this embodiment, the vehicle body vibration damping apparatus 1 is formed by the bumper reinforcement 11, and the viscoelastic rubber 66 filled in the bumper reinforcement 11. In a vehicle having the vehicle body vibration damping apparatus 1, when the vehicle body frame 4 and the bumper reinforcement body 61 are elastically deformed in the vehicle width direction at the time of turning, etc., the viscoelastic rubber 66 expands or contracts. Then, the action is buffered due to the damping effect of the viscoelastic rubber 66, so that the vibration generated after the elastic deformation can be dampened.

The vehicle body vibration damping apparatus 1 according to this embodiment is formed by preliminarily providing the viscoelastic rubber 66 to the bumper reinforcement 11, so that the apparatus can be mounted to the vehicle body frame 4 by attaching the bumper reinforcement 11 to the vehicle body frame 4.

Accordingly, it is unnecessary to provide the step of solely attaching the vibration damping portion such as the viscoelastic rubber to the vehicle body frame 4 in an assembly line of the vehicle body. Thus, the vehicle body vibration damping apparatus 1 according to this embodiment can be installed in the vehicle body frame 4 without increasing the number of steps in the assembly of the vehicle body. Moreover, in any vehicle, the bumper reinforcement 11 is originally a long product which is fixed to the vehicle body frame 4 in the vehicle width direction and has a structure capable of easily securing a dead space in its inner portion along its longitudinal direction. Accordingly, by disposing the vibration damping portion including the viscoelastic rubber in the dead space, the interference between the vibration damping portion and the other components can be prevented in the assembly of the vehicle body vibration damping apparatus 1 to the vehicle body frame 4. Consequently, there is no restriction regarding attaching positions and attaching methods, etc., of the vibration damping portion and the other components as in a conventional apparatus.

The bumper reinforcement body 61 in this embodiment has a similar effect as the bumper reinforcement body 14 explained in the first embodiment when it is curved so as to be convexed with respect to he vehicle body frame 4.

Moreover, the bumper reinforcement body 61 will be elastically deformed in the vehicle width direction as well as in the bending direction due to the elastic deformation of the vehicle body frame 4 in the vehicle width direction. Accordingly, the viscoelastic rubber 66 filled in the bumper reinforcement body 61 generates the damping force with respect to both the force in the vehicle width direction and the force in the bending direction. Consequently, in this embodiment, not only the vibration of the vehicle body frame 4 in the vehicle width direction can be dampened by the viscoelastic rubber 66 with high responsiveness but also the vibration can be effectively dampened by the viscoelastic rubber 66.

Fourth Embodiment

Figure 12:
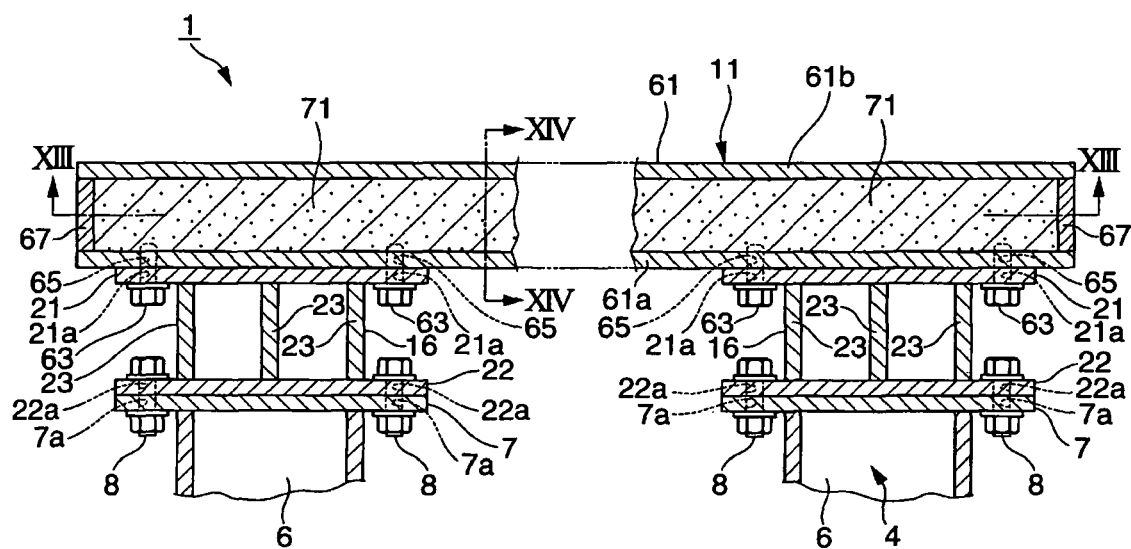
FIG. 12 is a horizontal cross-sectional view showing still yet another embodiment of the vehicle body vibration damping apparatus.
Figure 13:
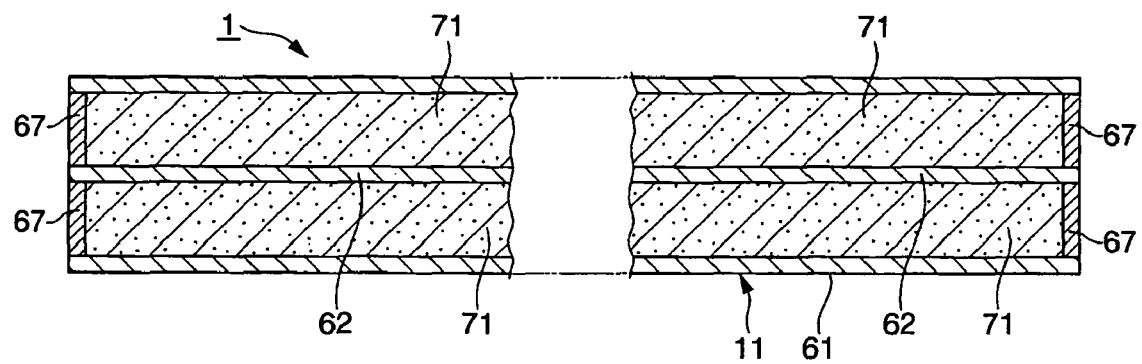
FIG. 13 is a cross-sectional view taken along the line XIII-XIII of FIG. 12.
Figure 14:
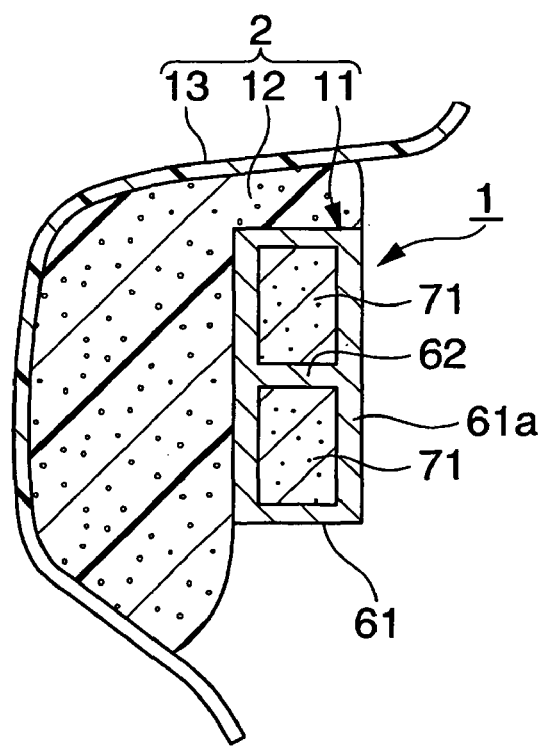
FIG. 14 is an enlarged cross-sectional view taken along the line XIV-XIV of FIG. 12.

According to a fourth embodiment, a vibration damping portion to be provided on the bumper reinforcement 11 can be formed by a particulate material as shown in FIGS. 12 through 14. In this regard, FIG. 12 is a horizontal cross-sectional view showing another embodiment of a vehicle body vibration damping apparatus. FIG. 13 is a cross-sectional view taken along the line XIII-XIII of FIG. 12, and FIG. 14 is a cross-sectional view taken along the line XIV-XIV of FIG. 12. FIG. 14 is illustrated in a state that the buffer member and the cover are attached to the bumper reinforcement body. In these figures, the identical and corresponding parts as those explained in FIGS. 1 through 4 are denoted by the same reference numerals and the detailed explanation thereof is appropriately omitted.

The bumper reinforcement 11 shown in FIGS. 12 through 14 includes the bumper reinforcement body 61 formed in the shape of a rectangular tube, lids 67 for closing both opening ends of the bumper reinforcement body 61, and a mounting member 16 for attaching the bumper reinforcement body 61 to a vehicle body frame 4. The bumper reinforcement body 61 is formed into a given shape by a drawing process similarly to the rectangular tube 17 shown in the first embodiment, and a partition wall 62 is provided therein. The partition wall 62 vertically divides the inner space of the bumper reinforcement body 61 into two parts. Additionally, in the bumper reinforcement body 61 in this embodiment, no upper plate 18 and lower plate 19 as shown in the first embodiment is provided.

The first plate member 21 of the mounting member 16 in this embodiment is attached to a vertical wall 61a of the bumper reinforcement body 61 adjacent to the vehicle body frame 4 by mounting bolts 63. The mounting bolt 63 is inserted through the bolt hole 21a formed in the first plate member 21, and screwed to a bolt hole 65 formed in the vertical wall 61a.

The lid 67 is inserted into the opening of the bumper reinforcement body 61 so as to seal a hollow portion of the bumper reinforcement body 61 and welded. Sand 71 constituting a particulate material in this invention is filled as the vibration damping portion in the hollow portion of the bumper reinforcement body 61. The sand 71 is densely filled such that there is no clearance in the hollow portion enclosed by the bumper reinforcement body 61 and the lid 67.

To fill the sand 71 in the hollow portion, for example, in a state in which one opening end of the hollow portion is closed by the lid 67, the sand 71 is filled in the hollow portion from the other end opening. Thereafter, the lid 67 is inserted into the other opening and welded.

In this embodiment, the vehicle body vibration damping apparatus 1 according to this invention is constituted by the bumper reinforcement 11 and the sand 71 filled in the bumper reinforcement 11.

In a vehicle having the vehicle body vibration damping apparatus 1, when the vehicle body frame 4 and the bumper reinforcement body 61 are elastically deformed in the vehicle width direction at the time of turning, etc., the external force is applied to the sand 71. Then, the action is buffered due to the damping effect generated by grinding of the particles of the sand 71, so that the vibration generated to the vehicle body frame 4 after the elastic deformation can be dampened.

The vehicle body vibration damping apparatus 1 according to this embodiment is formed by preliminarily filling the sand 71 in the bumper reinforcement 11, so that the apparatus can be mounted to the vehicle body frame 4 by attaching the bumper reinforcement 11 to the vehicle body frame 4.

Accordingly, it is unnecessary to provide the step of solely attaching the vibration damping portion including the particulate material to the vehicle body frame 4 in an assembly line of the vehicle body. Thus, the vehicle body vibration damping apparatus 1 according to this embodiment can be installed in the vehicle body frame 4 without increasing the number of steps in the assembly of the vehicle body. Moreover, in any vehicle, the bumper reinforcement 11 is originally a long product which is fixed to the vehicle body frame 4 in the vehicle width direction and has a structure capable of easily securing a dead space in its inner portion along its longitudinal direction. Accordingly, by disposing the vibration damping portion including the particulate material in the dead space, the possible interference between the vibration damping portion and the other components can be prevented in the assembly of the vehicle body vibration damping apparatus 1 to the vehicle body frame 4. Consequently, there is no restriction regarding attaching positions and attaching methods, etc., of the vibration damping portion and other components as in a conventional apparatus.

The bumper reinforcement body 61 in this embodiment has a similar effect as the bumper reinforcement body 14 explained in the first embodiment when it is curved so as to be convexed with respect to the vehicle body frame 4.

Moreover, the bumper reinforcement body 61 is elastically deformed in the vehicle width direction as well as in the bending direction due to the elastic deformation of the vehicle body frame 4 in the vehicle width direction. Accordingly, the sand 71 filled in the bumper reinforcement body 11 generates the damping force with respect to both the force in the vehicle width direction and the force in the bending direction. Consequently, in this embodiment, not only the vibration of the vehicle body frame 4 in the vehicle width direction can be dampened by the sand 71 with high responsiveness but also the vibration can be effectively dampened by the sand 71.

In the first to fourth embodiments described above, an example in which a plurality of plate members are assembled and welded in forming the mounting member 16 is shown. However, the mounting member 16 can be formed by molding such that the plate members are integrally formed.

Moreover, the configuration of the vehicle body frame 4 is not limited to a ladder type explained in the above embodiments, and any configuration is acceptable as long as it includes a pair of right and left bumper mounting portions 5. For example, the vehicle body frame 4 can have a monocoque structure (e.g., supporting via an external skin instead of an internal frame).

Moreover, it should be understood that the cross-section of the bumper reinforcement body 14 and 61 is not limited to one of the shapes shown in the first to fourth embodiments. It can be a simple rectangle with no partition wall 17a and 62, or it can include multiple partition walls 17a and 62.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A vehicle body vibration damping apparatus comprising:
    a bumper reinforcement arranged to be removably and rigidly attached to an end of a vehicle body frame such that the bumper reinforcement extends in a vehicle width direction; and
    a vibration damping portion attached to the bumper reinforcement; wherein
    the vibration damping portion includes a hydraulic damper having an elongated shape extending in the vehicle width direction and arranged to dampen elastic deformation and vibration of the bumper reinforcement and the vehicle body frame in the vehicle width direction; and
    the hydraulic damper includes first and second ends separated from each other in the vehicle width direction, each of the first and second ends being fixed to the bumper reinforcement.

2. The vehicle body vibration damping apparatus as recited in claim 1, wherein the bumper reinforcement includes a substantially rectangular tube extending in the vehicle width direction, an upper plate extending from an upper end portion of the substantially rectangular tube, and a lower plate extending from a lower end portion of the substantially rectangular tube; and
    the hydraulic damper is attached to an upper surface of the lower plate of the bumper reinforcement.

3. The vehicle body vibration damping apparatus as recited in claim 1, wherein the bumper reinforcement includes a substantially rectangular tube extending in the vehicle width direction, an upper plate extending from an upper end portion of the substantially rectangular tube, and a lower plate extending from a lower end portion of the substantially rectangular tube; and
    the hydraulic damper is attached to a lower surface of the lower plate of the bumper reinforcement.

4. The vehicle body vibration damping apparatus as recited in claim 1, wherein the bumper reinforcement is curved so as to protrude outwardly with respect to the vehicle body frame.

5. The vehicle body vibration damping apparatus as recited in claim 1, wherein the hydraulic damper includes a hydraulic cylinder including a piston, a damping force generator provided on the piston, a cylinder tube, a piston rod, a plug member arranged to block a first end of the cylinder tube opposite to the piston rod, a rod guide arranged to block a second end of the cylinder tube including the piston rod, a first mounting bracket fixed to the plug member, and a second mounting bracket connected to a distal end of the piston rod via an extension rod.

6. The vehicle body vibration damping apparatus as recited in claim 5, wherein the piston separates a first oil chamber and a second oil chamber in the cylinder tube, the piston is fixed to the piston rod, the first oil chamber is located between the piston and a free piston arranged to freely move within the cylinder tube, the free piston separates the first oil chamber and a high pressure gas chamber provided at one end portion of the cylinder tube, and the piston is urged in a direction such that the hydraulic cylinder is compressed by a compression coil spring elastically fitted between the piston and the rod guide.

7. The vehicle body vibration damping apparatus as recited in claim 1, wherein the bumper reinforcement is a substantially rectangular tubular member extending in the vehicle width direction, and the hydraulic damper is attached to a lower surface of a lower plate of the substantially rectangular tubular member.

8. The vehicle body vibration damping apparatus as recited in claim 1, wherein the hydraulic damper is attached to a mounting member disposed between the bumper reinforcement and the vehicle body frame.

* * * * *